(12) United States Patent
Yun

(10) Patent No.: US 7,349,354 B2
(45) Date of Patent: Mar. 25, 2008

(54) SERVING SOFT HANDOFFS BETWEEN MOBILE SWITCHING CENTERS THAT USE DIFFERENT PROTOCOLS

(75) Inventor: Sung Hyun Yun, Chungnam (KR)

(73) Assignee: LG Electronics Inc., Seoul (KR)

( * ) Notice: Subject to any disclaimer, the term of this patent is extended or adjusted under 35 U.S.C. 154(b) by 1085 days.

(21) Appl. No.: 10/299,859

(22) Filed: Nov. 20, 2002

(65) Prior Publication Data

US 2003/0119509 A1 Jun. 26, 2003

(30) Foreign Application Priority Data

Dec. 26, 2001 (KR) ............................... 2001-84722

(51) Int. Cl.
*H04B 7/00* (2006.01)
(52) U.S. Cl. .................. 370/310.1; 455/436; 455/439; 455/432.2; 455/204; 455/107; 370/466; 370/467; 370/465
(58) Field of Classification Search ........ 370/465–467; 455/432.2, 204, 170
See application file for complete search history.

(56) References Cited

U.S. PATENT DOCUMENTS 6,353,621 B1 * 3/2002 Boland et al. .............. 370/467
6,553,227 B1 * 4/2003 Ho et al. .................... 455/433
6,697,623 B1 * 2/2004 Munk ......................... 455/445

\* cited by examiner

*Primary Examiner*—Duc M. Nguyen
*Assistant Examiner*—Justin Lee
(74) *Attorney, Agent, or Firm*—Ked & Associates, LLP

(57) ABSTRACT

The present invention may relate to the following steps. Converting a bundle of data from a first format of a first mobile switching center to a second format of a switch. Routing, at the switch, the bundle data in the second format. Converting the bundle of data from the second format to a third format of the second mobile switching center. The first format and the third format are different formats. Mobile switching centers manage and operate base stations. The first mobile switching center and the second mobile switching center may be owned and operated by different companies. Accordingly, the first and second mobile switching centers will operate using different formats (or protocols). This is made possible by converting data between formats so it can be routed at a switch. This provides a particular advantage. A cell phone can now transparently change between base stations that are owned and operated by different companies. Accordingly, users of a cell phone will not be annoyed by interruptions in their call when they change base stations.

20 Claims, 5 Drawing Sheets

FIG. 2

| Mobile switching center name | Network ID | Port |
|---|---|---|
| MSC-A | 10, 11, 12 | A1, A2, A3, A4 |
| MSC-B | 20 | B1, B2 |
| MSC-B | 21 | B3 |
| MSC-C | 30 | C1, C2, C3, C4 |

FIG. 3

| Group | VPI | VCI | Port |
|---|---|---|---|
| MA1 | 5 | 30 | A1 |
| | | 31 | A2 |
| | | 32 | A3 |
| | | 33 | A4 |
| MB1 | 6 | 30 | B1 |
| | | 31 | B2 |
| MB2 | 7 | 30 | B3 |
| MC1 | 8 | 30 | C1 |
| | | 31 | C2 |
| | | 32 | C3 |
| | | 33 | C4 |

SERVING SOFT HANDOFFS BETWEEN MOBILE SWITCHING CENTERS THAT USE DIFFERENT PROTOCOLS

BACKGROUND OF THE INVENTION

1. Field of the Invention

The present invention generally relates to soft handoffs between mobile switching centers that use different protocols.

2. Background of the Related Art

Mobile radio communication systems are used in everyday life. Garage door openers, remote controllers for home entertainment equipment, cordless telephones, hand-held walkie-talkies, pagers, and cellular telephones are all examples of mobile radio communication systems. For example, cellular radio systems provide high quality service that is comparable to that of landline telephone systems.

Some cellular telephones communicate with base stations (with antennas at a fixed location) that are located proximate to the cell phone. However, as a user transports a cell phone, the base station which is proximate to the cell phone changes. Accordingly, a cell phone must then switch or change the base station it is communicating with to receive a better radio signal. This changing allows cell phones to continue conversations during geographic movement.

However, all base stations are not compatible. For instance, two base stations, which are located proximate to each other, may be owned by separate companies and operate using different protocols. Nevertheless, it is often necessary for a cell phone to change base stations which do not use the same protocol. When this occurs, calls are often disconnected or there is an interruption of service. This can be very annoying to a user of a cell phone. Accordingly, there is a need for relatively transparent changing of base stations when the base stations use different protocols.

SUMMARY OF THE INVENTION

The object of the present invention is to at least overcome the disadvantages discussed above. Embodiments of the present invention relate to the following steps. Converting a bundle of data from a first format of a first mobile switching center to a second format of a switch. Routing, at the switch, the bundle data in the second format. Converting the bundle of data from the second format to a third format of the second mobile switching center. The first format and the third format are different formats.

Mobile switching centers manage and operate base stations. The first mobile switching center and the second mobile switching center may be owned and operated by different companies. Accordingly, the first and second mobile switching centers may operate using different formats (or protocols). A switch is used to convert data between formats so that the first mobile switching center and the second mobile switching center can operate together seamlessly. This provides a particular advantage. A cell phone can now transparently change between base stations that are owned and operated by different companies. Accordingly, a user of a cell phone will not be annoyed by interruption in their call when they change base stations.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIG. 2 is an exemplary diagram illustrating a mobile switching center information table managed for a soft handoff among mobile switching centers of different companies.

FIG. 3 is an exemplary diagram illustrating an ATM routing table for a soft handoff among the mobile switching centers of different companies.

DETAILED DESCRIPTION OF PREFERRED EMBODIMENTS

A handoff switches a channel to continuously connect the channel among base stations or mobile switching centers in a mobile communication network. Handoffs may be classified as soft handoffs and hard handoffs. When a mobile terminal passes a boundary between different mobile switching centers, a handoff may need to be performed between the mobile switching centers. Accordingly, a method for controlling a trunk connecting mobile switching centers is required to handle a handoff. A hard handoff interrupts an original channel of a mobile terminal and connects a new channel in a short period of time.

A hard handoff between mobile switching centers may be generated when a mobile terminal moves between base stations belonging to different mobile switching centers. A hard handoff may be performed by a hardware type switch. Thus, instantaneous call interruption may be generated in a call process of a mobile terminal due to voice interruption in a handoff, thereby reducing quality of calls. In a worst case scenario, call failure may occur.

A soft handoff between mobile switching centers maintain two channels by holding an original channel at a first mobile switching center and connecting a new channel at a second mobile switching center. The soft handoff may utilize a router. The router may route a signaling message and a traffic message for a soft handoff between mobile switching centers. A virtual path identifier/virtual channel identifier (VPI/VCI) value may be used to set up a channel in a soft handoff among mobile switching centers using an Asynchronous Transfer Mode (ATM) switch.

Figure 1:
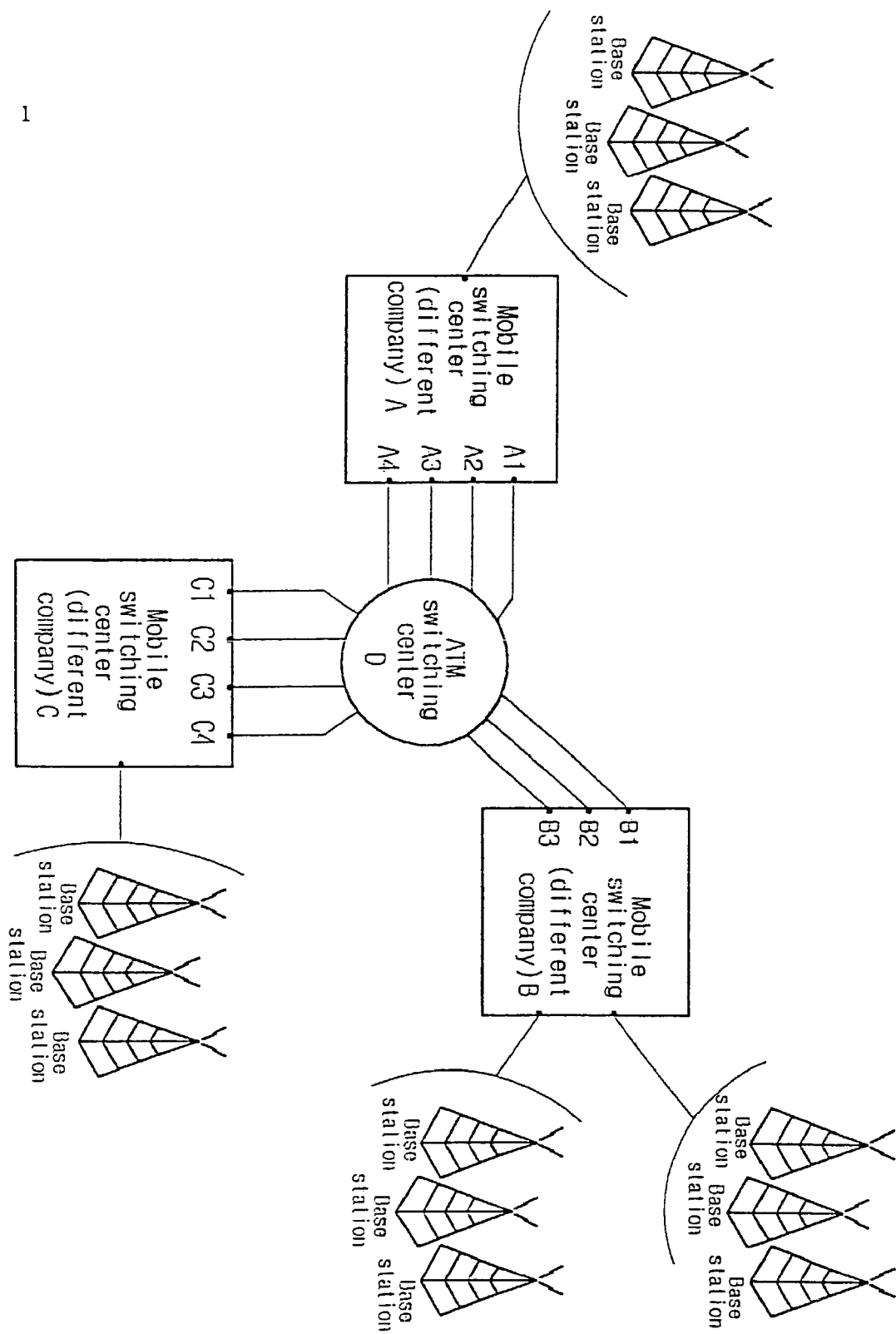
FIG. 1 is an exemplary schematic diagram illustrating a network structure for a soft handoff among mobile switching centers of different companies.

FIG. 1 is an exemplary illustration of a network structure for a soft handoff among mobile switching centers of different companies. FIG. 1 includes a plurality of mobile switching centers and an ATM switching center. The plurality of mobile switching centers (A, B, and C) may be of different companies (i.e., service providers) that may take charge of channels of data and/or control signals in a communication network of each respective service provider. ATM switching center (D) may be for serving a soft handoff among mobile switching centers (A, B, and C). FIG. 1 exemplifies a soft handoff function by an ATM switching center that connects mobile switching centers of three different companies.

A plurality of base stations for processing calls of mobile terminals and controlling call mobility are connected respectively to mobile switching centers (A, B, and C). The mobile switching centers may exchange cellular phone packets from base stations and transmit them to different base stations. A soft handoff among base stations of each mobile switching centers typically use the same protocol. Accordingly, message format can be handled by a self-routing algorithm.

In embodiments of the present invention, an ATM switching center may include an apparatus for serving a handoff which converts protocols and message formats. These embodiments may perform routing in a soft handoff among mobile switching centers of different companies, which have different protocols and message formats.

In embodiments, an apparatus for serving a handoff may perform at least one of the following tasks. Register ports connected to mobile switching centers of different companies by groups. Route ports by groups. Disperse and route traffic in a round robin method through a port composing respective groups. In embodiments, an apparatus for serving a handoff in an ATM switching center may manage a mobile switching center information table (exemplified in FIG. 2) and/or manage an ATM routing table (exemplified in FIG. 3).

The mobile switching center information table (exemplified in FIG. 2) has mobile switching center names (i.e., MSC-A, MSC-B, and MSC-C) for discriminating the mobile switching centers (A, B, and C) which are connected to ATM switching center (D) through ports. A mobile switching center information table may include network IDs 10, 11, 12, 20, 21 and 30 for notifying addresses of mobile switching centers for managing corresponding zones by regions. A mobile switching center information table may include port information A1, A2, A3, A4, B1, B2, B3, C1, C2, C3 and C4 of mobile switching centers (A, B, and C). An ATM routing table may include group information (MA1, MB1, MB2 and MC1) for registering ports connected to mobile switching centers by groups and dispersing and routing traffic in a round robin method. VPI and VCI values correspond to each port of respective mobile switching centers.

Mobile switching center names may be types when mobile switching centers perform self-routing in each network ID. For example, as shown in FIG. 2, when a network ID of MSC-B are '20' and '21', the handoff packet transmitted from '20' to '21' must be routed by a special router. In an exemplary ATM switching center, the four routing groups of FIG. 1 are MA1, MB1, MB2, and MC1.

Figure 4:
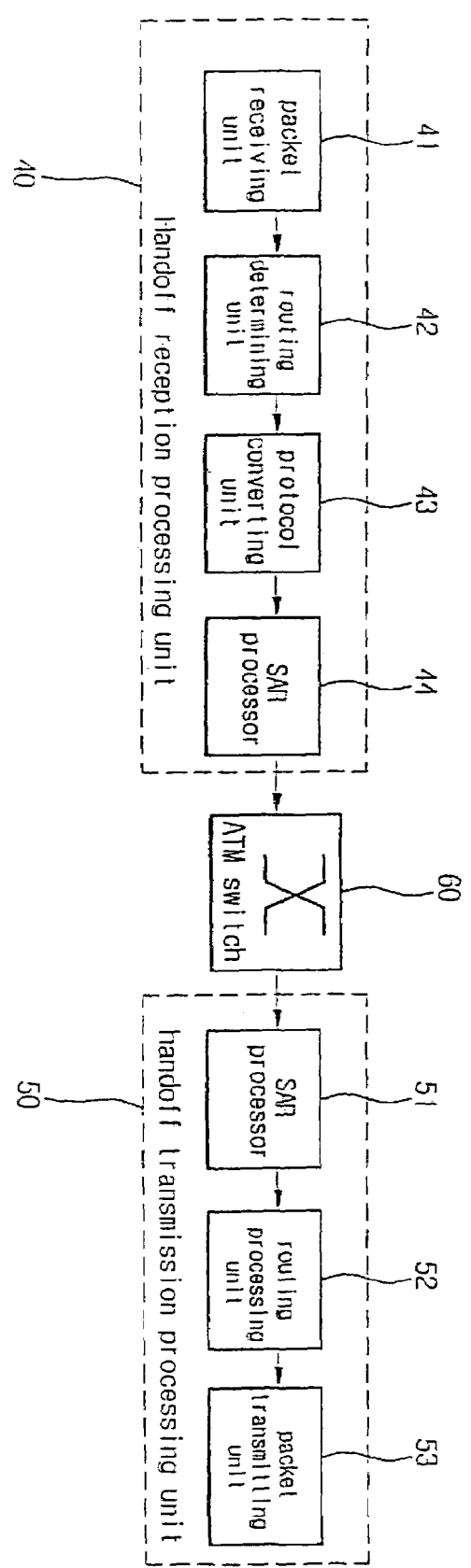
FIG. 4 is an exemplary detailed block diagram illustrating an apparatus for serving a handoff in an ATM switching center.

FIG. 4 is an exemplary illustration of an apparatus in accordance with embodiments of the present invention. These embodiments may include at least one of a handoff reception processing unit 40, an ATM switch 60, and a handoff transmission processing unit 50. Handoff reception processing unit 40 may be for determining a routing path VPI/VCI of a handoff packet from a mobile switching center in a round robin method by destination groups, converting a protocol, and/or transmitting a handoff packet to ATM switch 60. Handoff transmission processing unit 50 may be for relaying a handoff packet outputted through ATM switch 60 to a transmission port corresponding to a routing path determined by handoff reception processing unit 40. ATM switch 60 may also perform general switching functions.

Handoff reception processing unit 40 may include at least one of a packet receiving unit 41, a routing determining unit 42, a protocol converting unit 43, and a segmentation and reassembly (SAR) processor 44. Packet receiving unit 41 may be for converting frame data received from a port of a mobile switching center into a handoff packet according to a high level data link control procedure (HDLC), storing converted data in a receiving buffer (now shown), and/or generating an interrupt event. Routing determining unit 42 may be for searching a mobile switching center information table (exemplified in FIG. 2) and/or searching an ATM routing table (exemplified in FIG. 3) according to an interrupt event from packet receiving unit 41. Routing determining unit 42 may be for determining a routing path (VPI/VCI) value for serving a soft handoff in a round robin method in groups (i.e., MA1, MB1, MB2 and MC1) belonging to a destination of a handoff packet stored in a receiving buffer. Routing determining unit 42 may be for processing a handoff packet that contains a routing path. Protocol converting unit 43 may be for converting a protocol of a handoff packet processed by routing determining unit 42 to be suitable for a destination mobile switching center. Segmentation and reassembly (SAR) processor 44 may be for converting a handoff packet protocol converted by protocol converting unit 43 into an ATM adaptation layer5 (AAL5) packet, mapping a packet into an ATM cell, and/or transmitting a packet to an ATM switch 60.

Handoff transmission processing unit 50 may include at least one of a SAR processor 51, a routing processing unit 52, and a packet transmitting unit 53. SAR processor 51 may be for analyzing an ATM cell outputted through ATM switch 60, generating an AAL5 packet, and/or converting it into a handoff packet. Routing processing unit 52 may be for determining a transmission port for relaying a handoff packet converted by SAR processor 51 by searching an ATM routing table (exemplified in FIG. 3), storing a handoff packet in a corresponding transmitting buffer (not shown), and/or generating an interrupt event. Packet transmitting unit 53 may be for converting a handoff packet stored in a transmitting buffer into frame data according to an interrupt event of routing processing unit 52 and/or relaying frame data to another mobile switching center through a transmission port determined by routing processing unit 52.

Figure 5:
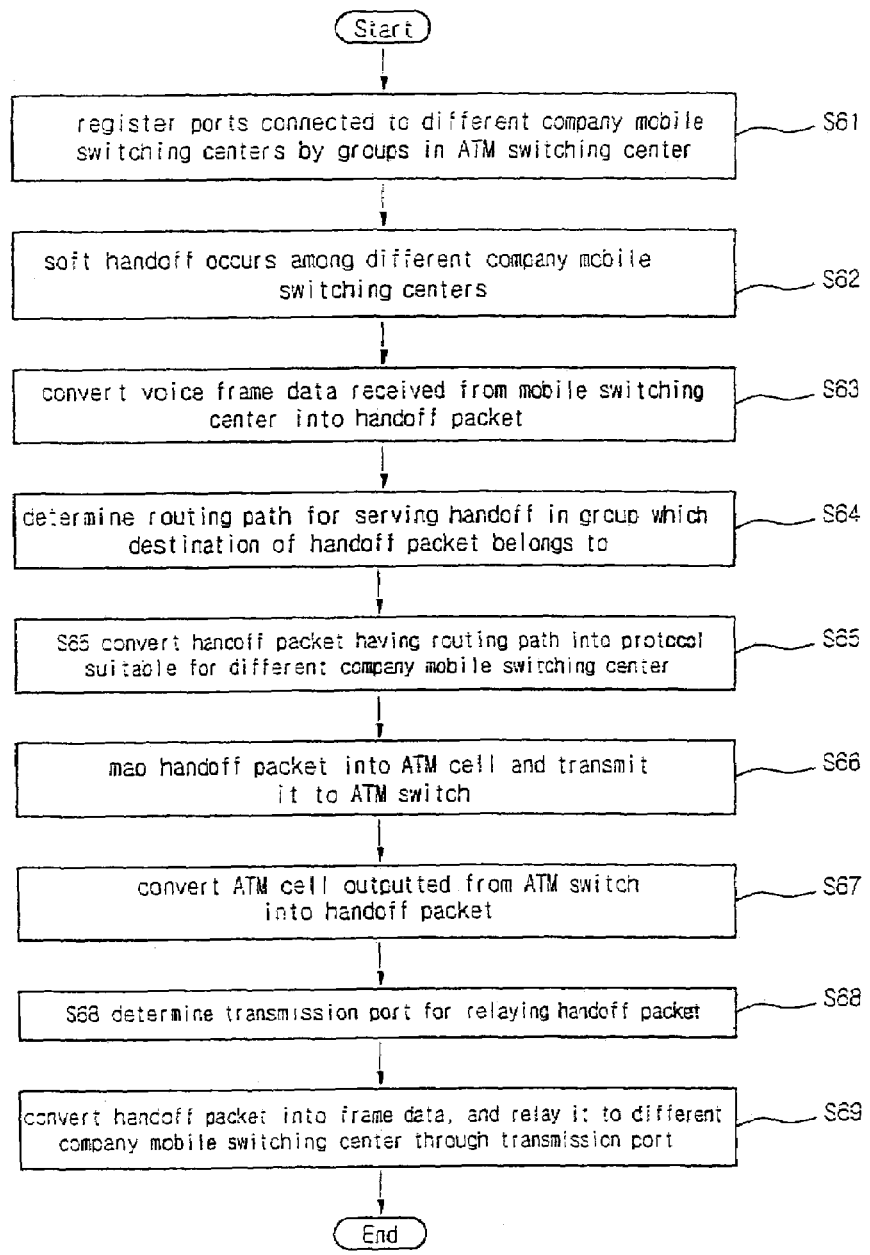
FIG. 5 is an exemplary flowchart showing an operation for serving a soft handoff among the mobile switching centers of different companies by an apparatus for serving the soft handoff using an ATM switching center.

FIG. 5 is an exemplary illustration of an operation for serving a soft handoff among mobile switching centers of different companies using an ATM switching center. Ports connected to mobile switching centers of different companies may be registered by groups in an ATM switching center (step S61). When a mobile terminal user performs a call in a zone occupied by a specific mobile switching center and moves to a zone occupied by a mobile switching center of a different company, a soft handoff may be generated (step S62). Voice frame data transmitted from a mobile switching center before a handoff may be transmitted to an ATM switching center through a port in order to handle a soft handoff.

Handoff reception processing unit 40 of an ATM switching center (exemplified in FIG. 4) may convert voice frame data transmitted to packet receiving unit 41 through a port into a handoff packet according to a HDLC (step S63), store a handoff packet in a receiving buffer, and/or generate an interrupt event to routing determining unit 42. Routing determining unit 42 may read a handoff packet stored in a receiving buffer by packet receiving unit 41, search a mobile switching center information table (exemplified in FIG. 2) through a network ID of a handoff packet, confirm a group belonging to a destination of a handoff packet, search an ATM routing table (exemplified in FIG. 3), and/or determine a routing path (VPI/VCI value) for serving a soft handoff in a round robin method in a group which belongs to the destination.

For example, a mobile switching center information table and an ATM routing table are exemplified in FIGS. 2 and 3. A group destination belongs to MA1. A received and converted handoff packet must be routed to mobile switching center MSC-A of a different company. A routing path VPI(5)/VCI(31) is determined as A2 port in the previous handoff. A routing path VPI(5)/VCI(32) is determined as A3 port according to a round robin method in a succeeding handoff for mobile switching center MSC-A of a different company. A routing path VPI(5)/VCI(33) is determined as A4 port in yet another succeeding handoff.

Routing determining unit 42 of handoff reception processing unit 40 may determine a routing path for relaying a handoff packet, process a handoff packet to contain routing path information, and transmit a handoff packet to protocol converting unit 43. Protocol converting unit 43 may convert a handoff packet processed by routing determining unit 42 into a protocol suitable for a mobile switching center of a different company and transmits a handoff packet to SAR processor 44 (step S65). SAR processor 44 may then convert a handoff packet transmitted from protocol converting unit 43 into an AAL5 packet, maps a AAL5 packet into an ATM cell, and transmits an ATM cell to ATM switch 60 (step S66), thereby processing reception of a handoff packet of a mobile switching center. SAR processor 51 of handoff transmission processing unit 50 may generate an original AAL5 packet by analyzing an ATM cell outputted through an ATM switch, convert a AAL5 packet into a handoff packet, and transmit it to routing processing unit 52 (step S67). Routing processing unit 52 may then search an ATM routing table, determine a transmission port for relaying a handoff packet from SAR processor 51 by using a VPI/VCI determined by a receiving unit (step S68), store a handoff packet in a transmitting buffer (not shown), and/or generate an interrupt event to packet transmitting unit 53.

Packet transmitting unit 53 sequentially converts handoff packets stored in a transmitting buffer by a routing processing unit in to frame data and repeats the data to a mobile switching center of a different company through a transmission port determined by a routing processing unit (step S69), thereby completing a serving of a handoff among mobile switching centers of different companies.

Embodiments of the present invention relate to an apparatus for serving a soft handoff among mobile switching centers having different protocols and/or message formats by using an ATM switching center. The apparatus may comprise a handoff serving means for converting a protocol and message format of a handoff packet in the ATM switching center, determining a routing path in a group which a destination of the handoff packet belongs to, and/or relaying the handoff packet to another mobile switching center through a corresponding connection port. The handoff serving means may comprise a handoff reception processing unit and a handoff transmission processing unit. The handoff reception processing unit may be for determining the routing path in a round robin method by groups which the destination of the handoff packet obtained by converting a data from the mobile switching center belong to, converting the protocol, and/or transmitting the handoff packet to a switching means. The handoff transmission processing unit may be for relaying the data outputted through the switching means to another mobile switching center through a transmission port corresponding to the routing path determined by the handoff reception processing unit.

The handoff reception processing unit may comprise a packet receiving unit, a routing determining unit, a protocol converting unit, and/or a segmentation and reassembly (SAR) processor. The packet receiving unit may be for converting frame data received from the mobile switching center through the port into a handoff packet according to a high level data link control procedure (HDLC), storing the converted data, and/or generating an interrupt signal. The routing determining unit may be for searching a mobile switching center information table and an ATM routing table according to the interrupt from the packet receiving unit, determining the routing path for serving the soft handoff in the round robin method in the groups which the destination of the stored handoff packet belongs to, and/or processing the handoffpacket. The protocol converting unit may be for converting the protocol of the handoff packet processed by the routing determining unit to be suitable for the destination mobile switching center. The segmentation and reassembly (SAR) processor may be for mapping the handoff packet protocol converted by the protocol converting unit into an ATM cell, and transmitting it to an ATM switch. The handoff packet protocol converted by the protocol converting unit may be converted into an ATM adaptation layer 5 (AAL5) packet, the AAL5 packet is mapped into an ATM cell, and/or the ATM cell is transmitted to the ATM switch.

The handoff transmission processing unit may comprise a segmentation and reassembly (SAR) processor, a routing processing unit, and/or a packet transmitting unit. The segmentation and reassembly (SAR) processor may be for converting the ATM cell outputted through the ATM switch into a handoff packet. The routing processing unit may be for determining a transmission port for relaying the handoff packet and/or generating an interrupt. The packet transmitting unit may be for converting the stored handoff packet into a frame data according to the interrupt of the routing processing unit and/or relaying the frame data to another mobile switching center through the transmission port determined by the routing processing unit. The handoff transmission processing unit may analyze the ATM cell outputted through the ATM switch, generates an AAL5 packet, and converts it into a handoff packet.

The mobile switching center information table may comprise mobile switching center names, a network ID, and/or port information. The mobile switching center names may be for discriminating the mobile switching centers which are connected to the ATM switching center through the ports and which the soft handoff is handled on. The network ID may be for notifying addresses of the mobile switching centers for managing corresponding zones by regions. The port information may be for connecting the mobile switching centers. The ATM routing table may comprise group information for registering the ports connected to the mobile switching centers by groups and dispersing and routing traffic in the round robin method and/or relate to VPI and VCI values corresponding to each port.

Embodiments of the present invention relate to a method for serving soft handoff among mobile switching centers which may comprise at least one of the following steps. Registering ports connected to different mobile switching centers by groups in an ATM switching center. Setting up a routing path for serving the handoff in a handoff packet group in the handoff among the mobile switching centers. Determining a transmission port for relaying the handoff packet, and relaying the data to another mobile switching center.

Embodiments of the present invention relate to a method for serving soft handoff among mobile switching centers, which may comprise at least one of the following steps. Registering ports connected to different mobile switching centers by groups in an ATM switching center. Converting frame data from the mobile switching center into a handoff packet in the ATM switching center for serving the soft handoff among the mobile switching centers. Determining a routing path for serving the soft handoff in a round robin method in the group which a destination of the handoff packet belongs to. Converting the handoff packet including the routing path into a protocol suitable for another mobile switching center. Mapping the handoff packet into an ATM cell, and transmitting the ATM cell to an ATM switch.

Embodiments of the present invention relate to a method for serving soft handoff among mobile switching centers which may comprise at least one of the following steps. Converting an ATM cell outputted through an ATM switch into a handoff packet. Determining a transmission port for relaying the handoff packet by searching an ATM routing table, and storing the handoff packet. Sequentially converting the stored handoff packets into frame data, and relaying the data to another mobile switching center through the transmission port.

Embodiments of the present invention relate to a method for serving soft handoff among mobile switching centers which may comprise at least one of the following steps. Registering ports connected to different mobile switching centers by groups in an ATM switch. Converting a frame data from the mobile switching center into a handoff packet in the ATM switch for serving the soft handoff among the mobile switching centers. Determining a routing path for serving the soft handoff in a round robin method in the group which a destination of the handoff packet belongs to. Converting the handoff packet including the routing path into a protocol suitable for another mobile switching center. Mapping the handoff packet into an ATM cell, and transmitting the ATM cell to an ATM switch. Converting the ATM cell outputted through the ATM switch into a handoff packet. Determining a transmission port for relaying the handoff packet by searching an ATM routing table, and storing the handoff packet. Sequentially converting the stored handoff packets into frame data, and relaying the data to another mobile switching center through the transmission port.

Embodiments of the presentinvention relate to a method for serving soft handoff among mobile switching centers which may comprise at least one of the following steps. Converting a data transmitted from the mobile switching center into a handoff packet in an ATM switching center for serving the soft handoff among the mobile switching centers. Determining a routing path for serving the soft handoff in a round robin method. Converting the handoff packet into a protocol suitable for another mobile switching center, and determining a transmission port for relaying the handoff packet. Converting the handoff packet into the data format, and relaying it to another mobile switching center through the transmission port.

The step for determining the routing path may comprise at least one of the following steps. Searching a mobile switching center information table by using a network ID of the handoff packet, and confirming a group to which a destination of the handoff packet belongs to. Searching an ATM routing table in the group which the destination belongs to, and determining VPI/VCI values corresponding to the routing path for serving the soft handoff in the round robin method.

The step for determining the transmission port for relaying the handoff packet may comprise at least one of the following steps. Converting the handoff packet containing routing path information into a protocol suitable for the destination mobile switching center of a different company. Mapping the protocol-converted handoff packet into an ATM cell, and transmitting the ATM cell to a switching means. Analyzing the ATM cell outputted through the switching means, and converting it into the handoff packet. Determining the transmission port for relaying the handoff packet by searching the ATM touting table, and storing the handoff packet. Sequentially converting the stored handoff packets into frame data, and relaying the data to another mobile switching center through the transmission port. The protocol-converted handoff packet may be converted into an AAL5 packet, mapped into an ATM cell, and transmitted to the ATM switch. An original AAL5 packet may be generated by analyzing the ATM cell outputted through the ATM switch, and converted into a handoff packet.

In accordance with embodiments of the present invention, an apparatus and method is for serving a soft handoff among mobile switching centers of different companies using an ATM switching center. Accordingly, traffic loads can be prevented from being concentrated on a specific connection port in a soft handoff among the mobile switching centers. This may be accomplished by registering the ports connected among the mobile switching centers by groups and dispersing and routing the traffic in a round robin method.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for performing a soft-handoff in a mobile communication system, comprising:
   converting a bundle of data of an existing call from a first format of a first mobile switching center into a handoff packet having a second format;
   determining routing information for a second mobile switching center;
   converting the handoff packet into a third format corresponding to the second mobile switching center;
   converting the handoff packet in the third format to a fourth format of a switch; and routing the handoff packet in the fourth format through the switch based on said routing information wherein the first format and the third format are different, wherein said determining includes:
   searching a first table that links information identifying each of a plurality of groups of mobile switching centers with information identifying ports connected to the mobile switching centers; and
   searching a second table that links each group of mobile switching centers and corresponding ports identified in the first table to virtual routing information, wherein:
   each of said groups of mobile switching centers process data in different formats,
   the handoff packet in the fourth format is routed through the switch based on information in the first and second tables, and
   the first mobile switching center and the second mobile switching center are included in different ones of said groups.

2. The method of claim 1, wherein the switch is an asynchronous transfer mode (ATM) switch.

3. The method of claim 2, wherein said converting, determining, and routing are performed by an ATM switching center that includes said ATM switch.

4. The method of claim 1, wherein the bundle of data is a packet.

5. The method of claim 4, wherein the packet embodies voice data.

6. The apparatus of claim 1, wherein the first table is included in the second table or the second table is included in the first table.

7. The method of claim 1, wherein at least the first format and the third format are different communication protocols.

8. The method of claim 1, further comprising:
converting the handoff packet in the fourth format routed through the switch to a handoff packet of another format; and
converting the handoff packet of said another format into frame data for transmission to the second mobile switching center. cols.

9. The method of claim 1, wherein at least the first format and the third format are different routing protocols.

10. The method of claim 1, wherein said routing includes determining a port of the second mobile switching center to receive the bundle of data in the handoff packet in the fourth format.

11. The method of claim 10, wherein the determining the port of the second mobile switching center to receive the bundle of data utilizes a round robin method.

12. An apparatus for performing a soft-handoff in a mobile communication system,
a processing circuit to convert a bundle of data of an existing call from a first format of a first mobile switching center to a second format of a second mobile switching center and to determine routing information for the second mobile switching center; and
a switch to route the bundle of data in a third format based on said routing information, the bundle of data in the third format derived from the bundle of data in the second format, wherein the first format and the second format are different, wherein the first processing circuit determines the routing information by:
searching a first table that links information identifying each of a plurality of groups of mobile switching centers with information identifying ports connected to the mobile switching centers; and
searching a second table that links each group of mobile switching centers and corresponding ports identified in the first table to virtual routing information, wherein:
each of said groups of mobile switching centers process data in different formats,
the handoff packet in the fourth format is routed through the switch based on information in the first and second tables, and
the first mobile switching center and the second mobile switching center are included in different ones of said groups.

13. The apparatus of claim 12, wherein the switch is an asynchronous transfer mode switch.

14. The apparatus of claim 12, wherein the bundle of data is a packet.

15. The apparatus of claim 14, wherein the packet embodies voice data.

16. The method of claim 12, wherein the first table is included in the second table or the second table is included in the first table.

17. The apparatus of claim 12, wherein the first format, the second format, and the third format are different communication protocols.

18. The apparatus of claim 12, wherein the first format, the second format, and the third format are different routing protocols.

19. The apparatus of claim 12, wherein the switch routes the bundle of data in the third format based on a determination of a port of the second mobile switching center to receive the bundle of data.

20. The apparatus of claim 19, wherein the determination of the port of the second mobile switching center to receive the bundle of data utilizes a round robin method.

* * * * *